United States Patent Office 2,818,422
Patented Dec. 31, 1957

2,818,422
ETHER-NITRILES

Samuel Allen Heininger, Dayton, Ohio, assignor to Monsanto Chemical Company, St. Louis, Mo., a corporation of Delaware No Drawing. Application February 5, 1957
Serial No. 638,236

4 Claims. (Cl. 260—465)

The present invention relates to nitrogenous compounds and more particularly provides hitherto unknown ether—nitriles, a method of preparing the same and soil fumigant compositions comprising said ether—nitriles.

An object of the present invention is the provision of new nitriles. Another object is the preparation of new and useful compounds. A further object of the invention is the preparation, from acrylonitrile and readily available phenolic materials of a class of compounds of utility in industry as plasticizers for synthetic resins, lubricant additives, dielectric fluids, etc.

These and other objects hereinafter disclosed are provided by the following invention wherein acrylonitrile is reacted with certain alkylphenols to yield new and valuable β-(alkylphenoxy) propionitriles substantially according to the scheme:

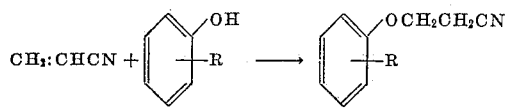

in which R is an alkyl radical of from 8 to 18 carbon atoms. The presently useful phenols are ar-mono-alkylphenols having from 14 to 24 carbon atoms. As herein employed ar- denotes substitution at an undesignated carbon atom of the aromatic nucleus. β-(alkylphenoxy) propionitriles provided by the present invention are, e. g., β-(4-n-octylphenoxy)propionitrile, β-[ar-(2-ethylhexyl)-phenoxy]propionitrile, β-(3-tert-octylphenoxy)propionitrile, β - (4 - nonylphenoxy)propionitrile, β - (ar - decylphenoxy)propionitrile, β-(ar-undecylphenoxy)propionitrile, β-(2-n-dodecylphenoxy)propionitrile, β-(ar-tridecylphenoxy)propionitrile wherein the tridecyl radical is derived from an alkyl halide made from "Oxo" process tridecanol manufactured from butylene trimer or propylene tetramer, carbon monoxide and hydrogen, β-(ar-tetradecylphenoxy)propionitrile, β - (ar - hexadecylphenoxy)-propionitrile, β-(ar-octadecylphenoxy)propionitrile, etc.

Particularly valuable for the preparation of the present β-(ar-alkylphenoxy)propionitriles are the branched chain ar-alkylphenols which are obtained by alkylation of phenol with lower olefin polymers, e. g., the ar-branched chain octylphenol prepared from phenol and diisobutylene, the ar-branched chain nonylphenol prepared from phenol and propylene trimer and the ar-branched chain dodecylphenol prepared from phenol and propylene tetramer or butylene trimer. The higher branched chain alkyl radicals may also be derived from an "Oxo" process alcohol.

According to the invention the present ether—nitriles are readily prepared by simply mixing the alkylphenol with acrylonitrile in the presence of a basically reacting agent as catalyst and allowing the resulting reaction mixture to stand at ordinary or increased temperatures until formation of the ether—nitriles has taken place. Depending upon the nature of individual alkylphenols and of the basic agent employed, the addition reaction may occur under varying conditions of temperature and pressure. For optimum yields however, it is advantageous to heat the reaction mixture at temperatures of say, from approximately 80° C. to the refluxing temperature of the refluxing mixture. It is also advantageous to employ gradual addition of the acrylonitrile to a mixture of the alkylphenol and basic catalyst whereby polymerization of acrylonitrile is substantially avoided or at least considerably minimized. Basically reacting materials which may be employed include alkali and alkali metal hydroxides, or basically reacting salts thereof such as sodium, potassium, lithium, calcium or magnesium hydroxides, carbonates or acetates; alkali or alkali metal alcoholates such as sodium methylate, organic bases such as pyridine, quaternary ammonium salts or bases, etc. While I prefer to use as a catalyst a material which is soluble in the alkylphenol, such solubility of the catalyst in the initial reactants is not a necessary property of the catalyst.

Inasmuch as molecular equivalents of the alkylphenol and acrylonitrile are involved in the formation of the present ether—nitriles, it is advantageous to employ stoichiometric proportions of the two reactants. If desired, however, any excess of either reactant may be employed since any unreacted material is readily separated from the product. Although I find that generally no extraneous solvent or diluent need be employed in the reaction, inert solvents or diluents may be used and are of particular advantage when working with the higher molecular weight alkylphenols, i. e., hexadecylphenol or octadecylphenol.

The present β-(alkylphenoxy)propionitriles are stable, high boiling materials which are generally viscous liquids. They may be advantageously employed in the chemical and allied industries for a wide variety of purposes, e. g., as biological toxicants, as plasticizers for synthetic resins, as lubricants or as lubricant additives, as liquid dielectrics, etc.

As will be hereinafter disclosed, the present higher alkylphenoxypropionitriles are characterized by low power factor values and high dielectric constants, which properties are very desirable in insulating materials that are to function as dielectric agents in capacitors.

The present invention is further illustrated, but not limited, by the following examples:

Example 1

A mixture consisting of 436.6 g. (2 moles) of a branched chain ar-mono-nonylphenol wherein the nonyl radical is derived from propylene trimer, 2 g. of sodium methoxide and 1 g. of sodium was heated to a temperature of 150° C. To the heated mixture there was then gradually added 135 g. of acrylonitrile over a period of 24 hours, during which time the reaction mixture was maintained at reflux (above 130° C. at first and finally 110° C.). The reaction mixture was kept at 110° C. for another 48 hours. At the end of that time it was neutralized with hydrochloric acid, diluted with acetone, and filtered. Distillation of the filtrate in vacuo gave 260 g. of the substantially pure β-(ar-nonylphenoxy)-propionitrile, B. P. 165–175° C./0.8 mm., $n_D^{25}$ 1.5043, and analyzing as follows:

|  | Found | Calcd. for $C_{18}H_{27}NO$ |
|---|---|---|
| Percent C | 79.56 | 79.8 |
| Percent H | 9.86 | 10.0 |
| Percent N | 5.23 | 5.16 |

Example 2

A mixture consisting of 524.8 g. (2.0 moles) of branched chain ar-dodecylphenol wherein the dodecyl radical was derived from butylene trimer, 10 g. of sodium methoxide and 5 g. of hydroquinone was heated to a temperature of 160° C. and acrylonitrile was passed into the reaction mixture at such a rate as to permit rapid refluxing. A total of 106 g. (2.0 moles) of acrylonitrile was thus added during 16 hours while the temperature of the reaction mixture was maintained at 125–160° C. After all of the acrylonitrile had been added, refluxing was continued for an additional 8 hours. Diluted hydrochloric acid and then water was aded to the reaction mixture, the whole was shaken in a separatory funnel until the aqueous layer remained acid, and the resulting organic layer was removed. Attempted distillation of the organic layer indicated decomposition of the product; so the organic material was again washed with aqueous hydrochloric acid. Distillation of the resulting washed material gave the substantially pure β-(ar-dodecylphenoxy)propionitrile B. P. 181–189° C./0.4 mm., $n_D^{25}$ 1.5018.

Example 3

A mixture consisting of 412.6 g. (2.0 moles) of a branched chain ar-octylphenol wherein the octyl radical was derived from diisobutylene, 3 g. of sodium methoxide and 5 g. of hydroquinone was heated to a temperature of 100° C. and 106 g. of acrylonitrile was added. The reaction mixture began to reflux rapidly and the temperature rose very slowly during a period of 3.5 hours to 110° C. At this point an additional 26.5 g. of acrylonitrile was added, whereby the temperature of the reaction mixture decreased to 101° C. Heating and stirring was then continued for 4 hours at the end of which time the temperature of the reaction mixture was 107° C. Addition of another 26.5 g. of acrylonitrile lowered the temperature to 99.5° C. The whole was then allowed to reflux overnight at a maximum temperature of 103° C. Neutralization of the resulting reaction mixture with hydrochloric acid and subsequent distillation gave the substantially pure β-(ar-octylphenoxy)propionitrile, B. P. 188–205° C./14 mm. (mainly 203–205° C.), $n_D^{25}$ 1.5075.

Example 4

The β-(nonylphenoxy)propionitrile of Example 1 was found to be an effective aquatic herbicide and molluscacide by employing the following testing procedure:

An oil-in-water emulsion of the compound was prepared by dissolving it in cyclohexanone and adding the resulting solution to water in such a quantity that the concentration of the nitrile was 5 parts per million parts of the emulsion. As emulsifying agent there was used a polyalkylene glycol—higher alkylbenzene-sulfonate mixture known to the trade as "Emulsifier L." The resulting emulsion (300 ml.) was added to a 1 pint container and specimens of coontail plants (*Ceratophyllum filamentous*) and snail (genus Physa) were introduced into the emulsion. The containers were then set in benches filled with water in order to reduce the extreme diurnal variations in temperature and held there for 7 days. At the end of that time inspection of the test specimens showed a complete kill of both the plants and the snails. Under the same test conditions but in the absence of the β-(nonylpheoxy)propionitrile both test specimens were in excellent condition at the end of the 7 day test period. The phytotoxicity and molluscacidal activity of the present nitrile in the very small concentrations used in the test were remarkable.

Example 5

This example shows dielectric utility of the β-(ar-nonylphenoxy)propionitrile of Example 1 and the β-(ar-octylphenoxy)propionitrile of Example 3 and provides a comparison of the electrical insulating properties thereof with those of some related compounds. The following electrical properties were determined with a Balsbaugh cell at 100 kilocycles and a temperature of 25° C. for the compounds shown below:

| | Dielectric Constant | Power Factor, Percent |
|---|---|---|
| β-phenoxypropionitrile | 2.5 | 7.8 |
| β-(4-cresoxy)propionitrile | 3.07 | 13.7 |
| β-(nonyloxy)propionitrile (Ex. 1) | 10.88 | 0.05 |
| β-(octyloxy)propionitrile (Ex. 3) | 11.7 | 0.3 |

The high dielectric constant and low power factor values of the β-(nonylphenoxy)propionitrile and of the β-(octylphenoxy)propionitrile are remarkable in view of the low dielectric constant and high power factor values of the β-phenoxypropionitrile and the β-cresoxypropionitrile. Since, as pointed out in the American Society for Testing Materials "Test for Dielectric Constant of Electrical Insulation," specification No. D150–54T (ASTM Standards, 1955, VI, p. 502) an insulating material which is to function as the dielectric of a capacitor should have a high dielectric constant value and a low power factor value, the present higher β-(alkylphenoxy)propionitriles are eminently suited for use as capacitor dielectrics.

This application is a continuation-in-part of my application Serial No. 412,063, filed February 23, 1954, and now abandoned.

What I claim is:

1. An ether—nitrile of the formula

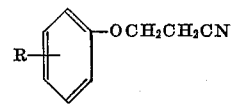

in which R is an alkyl radical of from 8 to 18 carbon atoms.

2. β-(nonylphenoxy)propionitrile.
3. β-(dodecylphenoxy)propionitrile.
4. β-(octylphenoxy)propionitrile.

References Cited in the file of this patent

UNITED STATES PATENTS 2,511,231    Weissberger et al. _____ June 30, 1950

FOREIGN PATENTS 670,357    Germany _____ Jan. 17, 1939